Feb. 19, 1957

C. J. VACANTI ET AL 2,782,317

DENTAL X-RAY FILM HOLDER

Filed Nov. 18, 1953

INVENTORS.
Marion H. Jackson
Charles J. Vacanti
BY

United States Patent Office 2,782,317
Patented Feb. 19, 1957

2,782,317

DENTAL X-RAY FILM HOLDER

Charles J. Vacanti and Marion H. Jackson, Omaha, Nebr.

Application November 18, 1953, Serial No. 392,805

3 Claims. (Cl. 250—70)

This invention relates to X-ray film holders of the type which are held alongside the teeth of a dental patient and more particularly it is an object of this invention to provide a device for holding X-ray film in this position more effectively than heretofore.

Heretofore X-ray film has been held in place by the patient's clamping of his teeth on a horizontal tab protruding outwardly from X-ray film disposed in a vertical plane. This has had a great disadvantage in the discomfort of holding the jaws in a fixed tense position over a period of time.

This has had a further disadvantage in that the patient tends to chew on the tab and move the film, with resulting inaccurate exposure.

Also the prior art method has had a disadvantage in that the film has been held flat in a vertical plane, whereby it does not fit the curvature of the mouth with the result that the corners of a rectangular film tend to uncomfortably gouge the gums of a patient.

Yet another disadvantage has been in that the film held in a flat plane does not conform to the curvature of the row of teeth whereby distorted exposures result at the forward and rearward edges of a rectangular film.

It is therefore an object of this invention to correct these disadvantages of the prior art by providing a film holder adapted to hold the film in an arcuate position conforming to the shape of the mouth and to the curvature of the teeth.

A further object of the invention is to provide a film holder which is adapted to be held by the teeth on both sides of the mouth for increased stability and also a corresponding lessening of the amount of clamping force the patient need apply to hold it in place.

Yet a further object is to provide a holder as described having a handle for convenient insertion and removal of the film holder thereby speeding the operation and conserving the dentist's time also making a more desirable operation. This is particularly true with children who constantly chew, thus moving the film and giving a distorted image.

A particular object of this invention is to provide an improved holder for holding film in the position for taking a simultaneous picture of both the upper and lower rows of teeth, although the holder can also be used, if desired, for one row of teeth.

Another object of the invention is the providing of a film holder that is handier than heretofore.

A particular object of the invention is to prevent cancer of the finger, one of the greatest occupational hazards of dentistry. It is not uncommon to hear of dentists losing their index finger and sometimes even their thumb through operations for the removal of cancer beginning in the index finger. Heretofore it has been necessary for a dentist frequently to hold a film in place in the child's mouth with his own finger, holding his finger directly in the path of dangerous X-rays in order to keep the film from shifting and moving about.

It is an object of this invention to provide a holder for film which is formed of a relatively stiff material and which is adapted to be clamped between the teeth on both sides of the mouth, rather than only one side as heretofore, in order to hold the film in a much more stable fashion.

A further object of the invention is to provide a holder which can be used on either the right or left hand side of the mouth. This is accomplished by the provision of a design in which the handle is offset from the film holding portion. In this way, the handle tends to extend outwardly through the space between the teeth which appears on each side of the mouth at times when the upper and lower incisors are set against each other.

A further object of the invention is to provide a holder with greater versatility than heretofore, whereby it is possible to use periabical film. This type of film is more economical than the regular film bite-wing film. Regular bite-wing film is made up special in special packets with the tab already attached.

A further object of the invention is to provide a holder for holding film in such a position that all posterior teeth in one side of the mouth can be filmed in one exposure, as the curvature of the film follows the curvature of the mouth, the taking of this type of an exposure of this many teeth heretofore costing much more because of the necessity of using the special bite-wing film.

A further object of the invention is to provide a film holder which makes it possible to detect decay in the roots of the teeth even at times when a bite-wing exposure is being made. Heretofore a dentist making a bite-wing exposure at times when he was interested only in the crown portion could not at the same time accidently discover decay in the roots as the common bite-wing film does not make an exposure of the roots of the teeth. To clarify this point, while it is possible to see the exposure of roots with the usual bite-wing film, nevertheless the detection of decay in the roots is not practical because of the distortion due to the fact that the usual bite-wing film is held in a flat position.

A further object of the invention is to provide a holder which makes it possible to obtain good bite-wing exposure of the roots of the upper and lower posterior teeth simultaneously and clearly by the proper positioning of the handle portion of the holder whereby it comes between the teeth and out of the mouth at the sides instead of between the incisors. We have found that when the holder handle must extend to the front teeth the teeth are spaced much farther apart consequently, the roots of the posterior teeth are spaced above and below the standard X-ray film whereby their roots do not appear on a picture as clearly as when the teeth are closer together.

A still further object of the invention is to provide a film holder formed of a material which would not interrupt the passage of X-ray whereby the exposed film does not have a line through its center as pronounced as the line which would be present if the holder were made of metal. We prefer a plastic material because the line remaining is barely visible, although we wish we could claim as an object the use of any material of a suitable nature which is of a non-X-ray interrupting, radiolucent material.

A particular object of the invention is to provide a holder which is much more comfortable for the patient than heretofore. Patient's customarily hold the bite-wing holder with considerable jaw tension and for such a period of time as to be very uncomfortable. However, our holder causes the film to assume a curved position whereby it corners miss the adjacent curved areas of the mouth and do not gouge them sharply as do films held in a flat plane.

A particular object of the invention is to provide a holder for eliminating the principal disadvantage of the bite-wing tab holder, namely, the tendency of patients to chew on the tab to the extent that the tab is loosened from the pocket portion resulting in a ruined film because the dentist does not realize that the tab has been chewed away until after the film has been exposed in an improper position.

A further object of the invention is the provision broadly of the conception holding X-ray film in a curved position, regardless of the particular form of the holder itself as this is a new conception.

A surprising discovery we have made has been that the curvature of the teeth in the mouths of most adults is substantially uniform. The curvature of the teeth of children is greater than the curvature of the teeth of adults and is also substantially uniform in most children.

A further object is to provide a holder which can be held in the mouth with much less strain on the jaw muscles than heretofore because the holder is held with equal pressure between the teeth on both sides of the mouth. The unequalled strain of the common bite-wing holder tab on only one side of the mouth.

Yet another object is to provide a holder which will eliminate a disadvantage of bite-wing holders in that because bite-wing holder tabs are held on only one side of the mouth, there is a tendency to throw the jaw to one side thus twisting the tab out of a horizontal position and consequently holding the film out of a preferred vertical position. This sliding of the film tends to distort the exposure in different directions at the top and bottom.

Still another object is to provide an X-ray film holder making possible a more economical method of making bite-wing exposures.

A further object of the invention is to provide a film holder having a slot for receiving the film, the slot being closed at both ends for holding the film in a more stable position, so as to prevent it from rotating in the slot as is a problem with holders having open slots.

Other and further objects and advantages of the present invention will be apparent from the following detailed description and claims and are illustrated in the accompanying drawings which, by way of illustration, show the principles of the invention and a mode in which I have contemplated applying those principles.

Other embodiments of the invention embodying the same or equivalent principles may be used and structural changes may be made as desired by those skilled in the art without departing from the present invention and the purview of the appended claims.

Figure 1:
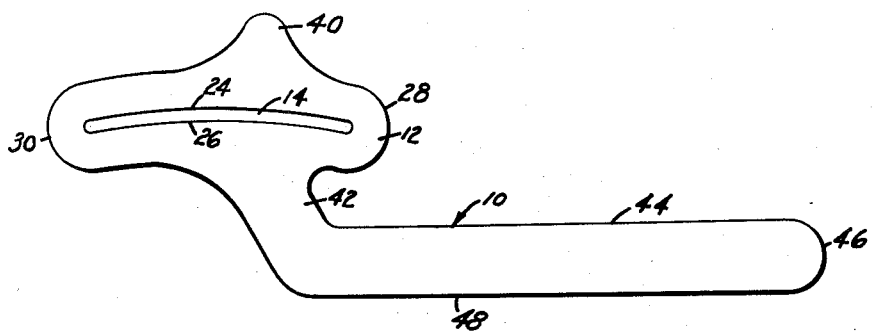
Figure 1 shows the preferred form of the film holder of this invention in top plan view.

The dental film holder of this invention is shown in its preferred form in Figure 1 at 10.

The film holder has a film holding portion generally indicated at 12 having an elongated opening 14 therethrough into which a rectangular dental film 20 can be placed. The film 20 is relatively thin and the opening 14 is preferably of a width for snugly receiving the film 20.

The opening 14 is preferably curved to a slight degree, the curvature being substantially the same as the curvature of the teeth at the side of the mouth, whereby the walls of the opening 14 are on one side convex as shown at 24 and on the other side concave as shown at 26.

The forward and rearward ends 28 and 30, respectively, of the center portion 12 are rounded so that when they engage the mouth, they do not cause discomfort.

On that side of the film holding portion 12 which is adjacent the convex side 24 of the opening 14, a tooth engaging portion 40 is provided which is adapted to be gripped between the teeth.

On the opposite side of the film holding portion 12, the holder has a portion 42 which extends preferably in a direction transverse with respect to the opening 14 and slightly toward the forward end 28 of the film holding portion 12. The portion 42 connects the film holding portion 12 with a handle portion 44.

The handle portion 44 is elongated and is preferably straight and extends generally in a direction in approximate parallelism with the elongated opening 14 so that at times when the opening 14 is disposed in parallelism with the teeth at the side of the mouth, the handle 44 will extend forwardly and out through the mouth opening. The forwardmost end 46 of the handle 44 is preferably rounded as shown.

For purposes of descriptive terminology, those parts of the holder which are disposed outwardly of the handle 44 from the point which is indicated approximately by the numeral 48 shall be referred to as the handle. It will be understood that the teeth on the opposite side of the mouth from those which clamp on the portion 40 clamp upon the holder at the point between the point 48 and the connecting portion 42, whereby that portion of the holder which includes the section 42 and the inner section of the handle out to a point indicated by the numeral 48 can be referred to as a tooth gripping portion which can be gripped between the teeth.

Figure 2:
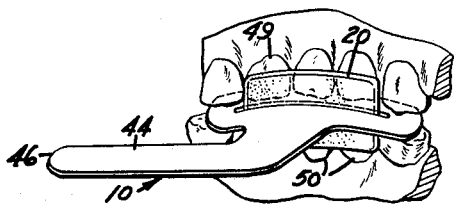
Figure 2 shows the film holder of Figure 1 together with a section of the mouth showing the relative position of the teeth, the holder and the film.
Figure 3:
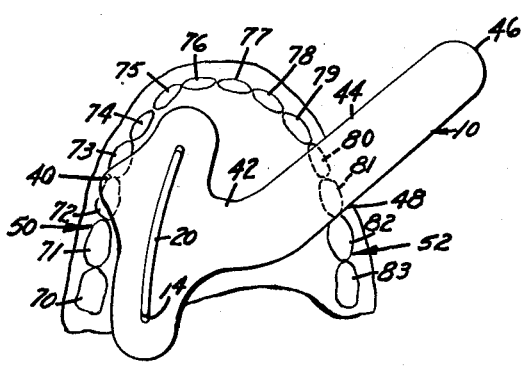
Figure 3 is a top plan view of the film holder and the lower jaw partially shown.

Referring to Figure 3 it will be seen that the holder is gripped on the portion 40 between the upper and lower teeth, the upper teeth being indicated in Figure 2 at 49 and the lower teeth being indicated in Figures 2 and 3 at 50 on one side of the mouth.

Another portion of the holder is held between the upper and lower teeth on the other side of the mouth, the lower teeth in this position being indicated at 52.

It will be seen that the film 20 is held in an arcuate position such that its convex side is disposed adjacent the convex inner sides of the teeth 49 and 50, this curvature having many advantages discussed above.

Referring to Figure 3, a normal set to teeth includes four back teeth on each side as seen in 70, 71, 72 and 73 and three incisors as seen at 74, 75 and 76. The incisor 74 is the canine tooth. Also shown in Figure 3 are three incisors on the other side of the mouth numbered 77, 78 and 79, the incisor number 79 being a canine tooth. Also seen in Figure 3 are back teeth on the right hand side numbered 80, 81, 82 and 83.

In Figure 3 the holder is shown in a position such that the portion 40 is clenched between the teeth on one side of the mouth and the handle extends out from between the teeth on the other side of the mouth at a point just rearwardly of the respective canine tooth 79 and across the back teeth 80 and 81. In this way the handle extends outwardly at a side of the mouth in what is known as the "curve of spee." The "curve of spee" is the curvature of the teeth formed because the canine teeth extend down farther than the back teeth.

Therefore, it is advantageous to so design the holder so that the handle thereof extends outwardly across back teeth. If it extends outwardly across the incisors then the teeth would be held apart so far at the front that the teeth do not comfortably and effectively clench upon the protrusion 40.

As thus described, it will be seen that this holder construction fulfills the objects of the invention.

From the foregoing description, it is thought to be obvious that a dental X-ray film holder constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

We claim:

1. A dental X-ray film holder comprising a portion adapted to receive and hold an X-ray film of a type adapted to be placed in the mouth for X-ray photography of the teeth, and portions attached to said film holding portion and disposed one on each side thereof respectively to be gripped between the teeth, said tooth gripping portions being so disposed and shaped that one of said portions on one side of said film holding portion can be gripped between the teeth on one side of the mouth while the other of said tooth gripping portions is gripped between the teeth on the other side of the mouth, whereby the film is held in position with stability, said other tooth gripping portion being so disposed with respect to said film holding portion that when said film holding portion is disposed parallel to and on the inner side of the teeth on one side of the mouth then said other tooth gripping portion will be disposed between the teeth on the other side of said mouth at a point at the forward end of the row of teeth on said other side.

2. A film holder as described in claim 1 in which one of said tooth gripping portions is provided with an elongated handle whereby the film holder can be conveniently inserted and removed from the mouth of a patient, said elongated handle being laterally offset with respect to said film holding portion.

3. The film holder described in claim 1 in which said film holding portion is provided with a slot extending vertically therethrough for receiving the film, said slot being curved and having a convex side adapted to be placed adjacent the inner side of the teeth and a concave side to be disposed toward the inside of the mouth.

References Cited in the file of this patent

UNITED STATES PATENTS

| | | |
|---|---|---|
| 2,005,993 | Heron et al. | June 25, 1935 |
| 2,035,051 | Daly | Mar. 24, 1936 |
| 2,392,109 | Vlock | Jan. 1, 1946 |